(12) United States Patent
Peyre et al.

(10) Patent No.: US 6,477,917 B1
(45) Date of Patent: Nov. 12, 2002

(54) AUTOMATIC CYCLE PEDAL

(75) Inventors: Henri Peyre, Saint Bénin d'Azy (FR); Damien Vassault, Aix en Provence (FR)

(73) Assignee: Look Cycle International, Nevers (FR)

( * ) Notice: Subject to any disclaimer, the term of this patent is extended or adjusted under 35 U.S.C. 154(b) by 12 days.

(21) Appl. No.: 09/604,424

(22) Filed: Jun. 26, 2000

(30) Foreign Application Priority Data

Jun. 25, 1999 (FR) .............................. 99 08130

(51) Int. Cl.[7] .................................................. G05G 1/14
(52) U.S. Cl. ....................................... 74/594.6; 74/594.4
(58) Field of Search ........................... 74/594.6, 594.4; 36/131, 132, 134

(56) References Cited

U.S. PATENT DOCUMENTS

| | | | |
|---|---|---|---|
| 5,105,683 A | * | 4/1992 | Mercat et al. ............. 74/594.6 |
| 5,381,708 A | | 1/1995 | Liao ......................... 74/594.6 |
| 5,765,450 A | * | 6/1998 | Kruger et al. ............. 74/594.6 |

FOREIGN PATENT DOCUMENTS

| EP | 0359845 A1 | 3/1990 |
|---|---|---|
| EP | 0393586 A1 | 10/1990 |

* cited by examiner

*Primary Examiner*—David A. Bucci
*Assistant Examiner*—Justin Stefanon
(74) *Attorney, Agent, or Firm*—Young & Thompson

(57) ABSTRACT

The pedal comprises a pedal body (1) provided with a fixed front hook (2) for engagement with a retaining plate fixed below a bicycle shoe, and a rear engagement hook (3) carried by a swinging lever (5) articulated on a support (6) in the pedal body (1) whilst being continuously urged by a spring (11) toward the retaining position of the rear hook. The front and rear hooks (2, 3) coact to maintain the retaining plate of the shoe against a bearing surface (4) provided on an upper surface of the pedal. The spring comprises a curved resilient leg (11) coacting with the lever (5), and the curved resilient leg (11) is associated with a snap-on securement (14) onto a pedal axle (3) adapted to be connected to a pedal crank.

9 Claims, 2 Drawing Sheets

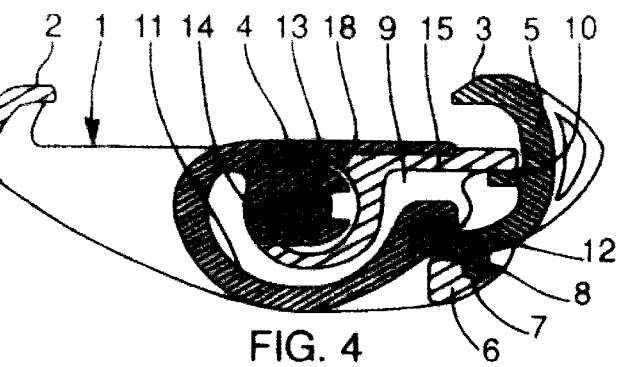
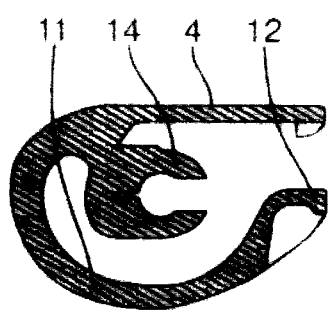
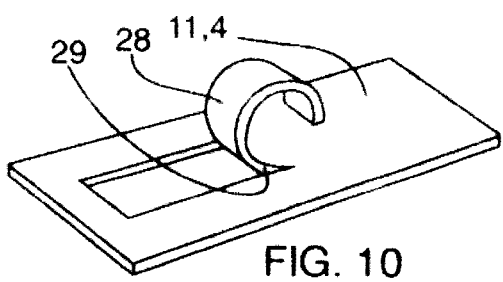
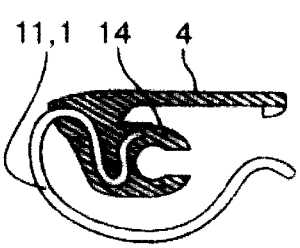
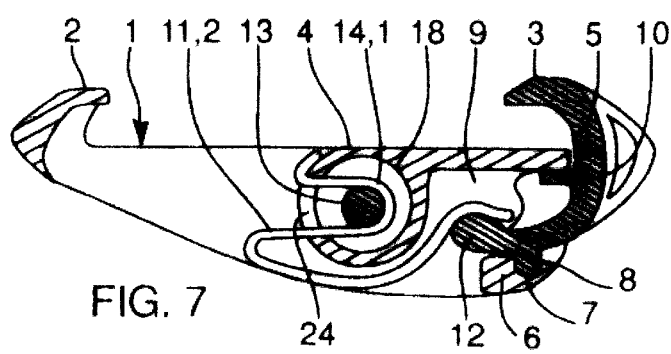
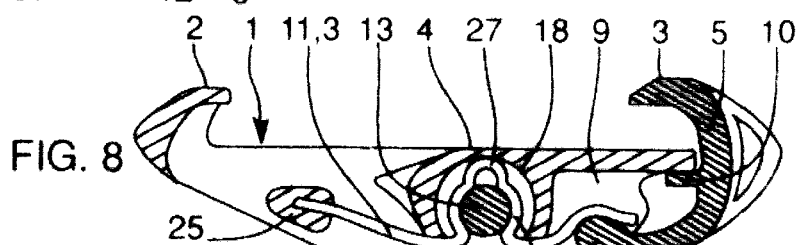
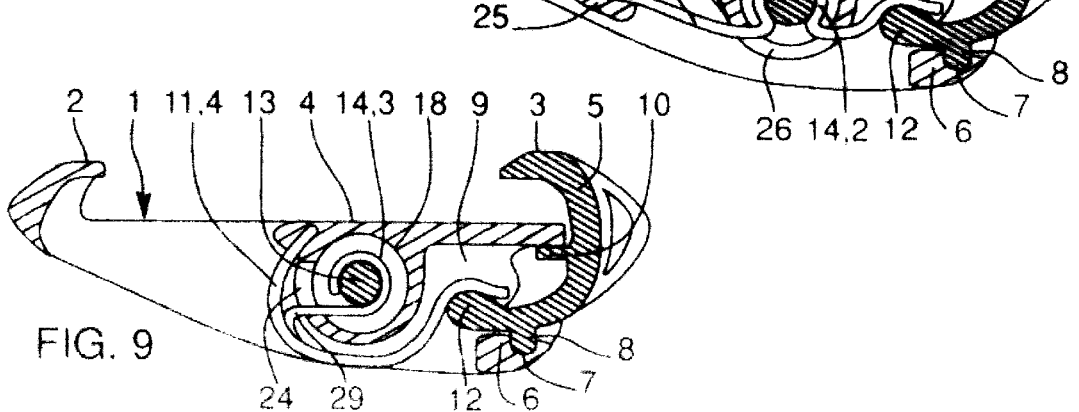

AUTOMATIC CYCLE PEDAL

This application corresponds to French application 99.08130 filed Jun. 25, 1999, the disclosure of which is incorporated herein by reference.

BACKGROUND OF THE INVENTION

The invention relates to an automatic cycle pedal for the rapid securement of the shoe of a cyclist to the pedal.

There are known pedals of this type comprising a pedal body provided with a shape to engage a retaining plate of the shoe of a bicycle shoe and a rear swinging retaining hook. This rear hook is prestressed by resilient means which ordinarily is constituted by at least one spring which can be of the coil compression type, the torsion type, the tension type or the blade type. The pedal moreover often comprises a camera screw device permitting the adjustment of the tension of the resilient means.

The pedal body is moreover provided with a tapped transverse bore for the securement to the body of an axle connected to a pedal crank of the bicycle. This axle is mounted in a bearing disposed in the pedal body and permits rotation of the pedal about the axle during pedaling.

Thus, these pedals comprise generally a relatively large number of pieces which also require certain machining, in particular for providing the tapping of the bore for the securement of the pedal axle which is received in bearings that are relatively bulky and expensive to make because they often comprise roller bearings or needle bearings.

SUMMARY OF THE INVENTION

An object of the invention is to provide a simple means for securing the axle of the pedal body, permitting omitting the tapping necessary for conventional pedals of this type.

Another object of the invention is to provide a pedal comprising a restricted number of pieces and which as a result is less expensive to make relative to the case of pedals now on the market.

Another object of the invention is to provide an extremely simple and reliable pedal at the level of the rear swinging retaining hook and which can comprise a simple and effective means for adjustment of the tension of the resilient means controlling the swinging of the rear hook.

Still another object of the invention is to provide a pedal in which the wear members can easily be replaced.

The object of the invention is an automatic cycle pedal, of the type comprising a pedal body provided with a fixed front hook for engagement with a fixed retaining plate under a bicycle shoe, and a rear clamping hook carried by a swinging lever articulated on a support in the pedal body, whilst being continuously urged by resilient means toward the retaining position of the rear hook, the front and rear hooks being adapted to coact to maintain the retaining plate of the shoe against a bearing surface provided on an upper surface of the pedal, characterized in that the resilient means comprises a curved resilient leg coacting with said lever, and in that said curved resilient leg is associated with a securement means by snapping onto a pedal axle adapted to be connected to a pedal crank.

According to other characteristics of the invention:
- the pedal body and the curved resilient leg are made of a single piece of a synthetic material;
- the curved resilient leg is a blade or a steel spring member or similar metal;
- and the snap-on securement means are made of a single piece of metal of which one of the ends bears against the lever and the other end is connected to the pedal body;
- the securement means for snapping the pedal body onto the axle is of a synthetic material and is overmolded on the resilient leg;
- the resilient means constitutes with the snap-on securement means a detachable assembly that can simultaneously be snapped on the pedal axle and on the body of the pedal;
- the resilient leg has an end shape whose distance to an end of the lever is adjustable to adjust the tension of the latter;
- said distance is adjustable with the help of a cam or an adjustment screw screwed into the end of the resilient leg and bearing on said end of the lever;
- the detachable assembly comprises a bearing surface adapted to come into contact with the retaining plate for the bicycle shoe;
- the pedal axle is provided with a throat receiving the securement means by snapping in, so as to define the axial play of the axle;
- the pedal axle is provided with two smooth bearings disposed on opposite sides of said throat.

BRIEF DESCRIPTION OF THE DRAWINGS

The invention will now be described in greater detail with the help of a non-limiting example of several embodiments of the pedal according to the invention, with reference to the accompanying drawings, in which:

FIG. 4 is a longitudinal cross-sectional view of a pedal according to another embodiment of the invention;

FIG. 5 is a longitudinal cross-sectional view of a piece of FIG. 4;

FIG. 6 is a modified embodiment of the piece of FIG. 5;

FIG. 7 is a longitudinal cross-sectional view of a pedal according to another embodiment of the invention;

FIG. 8 is a longitudinal cross-sectional view of a pedal according to another embodiment of the invention;

FIG. 9 is a longitudinal cross-sectional view of a pedal according to another embodiment of the invention; and FIG. 10 is a perspective view of a blank for the production of the resilient element of FIG. 9.

DESCRIPTION OF THE PREFERRED EMBODIMENTS

Figure 1:
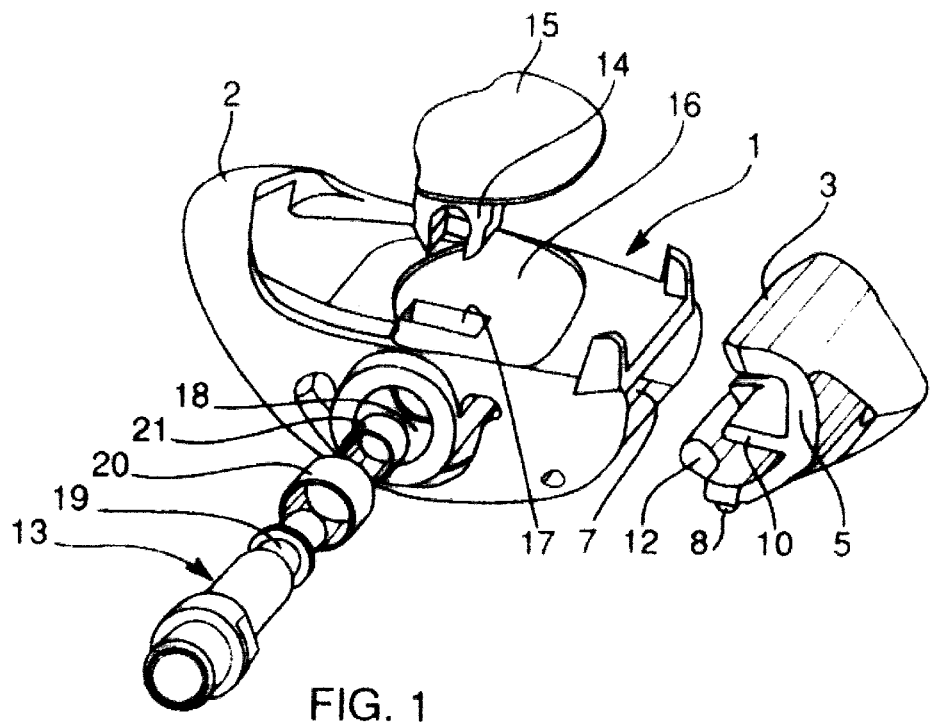
FIG. 1 is an exploded perspective view of a pedal according to a first embodiment of the invention.
Figure 2:
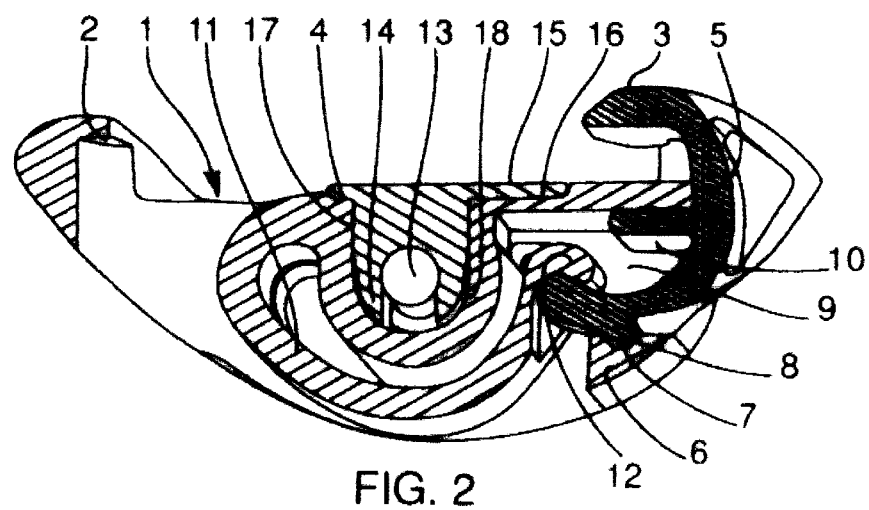
FIG. 2 is a longitudinal cross-sectional view of the pedal of FIG. 1.

FIGS. 1 and 2 show a first embodiment of the pedal according to the invention. This pedal comprises a pedal body 1 provided with a fixed front hook 2 and a swinging rear hook 3. A retaining plate fixed below a cyclist's shoe (not shown) can engage below the front hook 2 to be fixed by snapping in between the hooks against a bearing surface 4 on the upper surface of the pedal body.

The rear hook 3 is carried by a lever 5 swingably mounted on a support 6 of the pedal body 1. This support comprises a cylindrical groove 7 receiving a cylindrical rib 8 disposed on the lower portion of the lever 5. The rib 8 is complementary to the groove 7 such that these two elements form an articulation between the lever 5 and the support 6.

The lever 5 is generally E shaped, swingably mounted in a recess 9 provided at the rear of the pedal body 1. The intermediate leg 10 of the lever 5 comes, when the lever is urged toward its retaining position, into abutment against the upper internal wall of the recess. The lever could naturally have another shape and comprise a shoulder coming into abutment against this same wall.

The lever 5 is continuously urged toward its retaining position by a resilient means constituted by a curved blade 11 whose end is curved back in the other direction to form a hook 12 which coacts with the swinging lever 5.

This curved blade 11 and the support 6 for the swinging lever 5 are molded with the pedal body 1. As a result, the material used must be selected to give sufficient resilience, which is achieved for example by certain synthetic materials.

The curved blade 11 is, at its end opposite the end 12, associated with a snap-in means of the pedal body 1 on a pedal axle 13. This snap-in means comprises a clip 14 fixed below a plate 15 disposed in a recess of complementary shape provided in the upper surface of the pedal body 1. This plate 15 moreover constitutes at least one portion of the bearing surface 4 of the retaining plate of the cyclist's shoe.

The clip 14 extends through a slot 17 to project into a smooth bore 18 for the reception of the pedal axle 13. The clip 14 thus extends perpendicularly to the axis of the bore and is adapted to be disposed by snapping into a throat 19 of the pedal axle to block the latter axially. The axle 13 is, for rotation of the pedal body 1, guided in two smooth bearings 20 and 21 threaded on the pedal axle 13 and disposed on opposite sides of the throat 19 of the latter so as to define with this throat the axial play of the axle.

The assembly forming the pedal axle is thus constituted by simple pieces that are few in number. The axial play is controlled by a single piece, which is to say the clip 14 which can, with the plate 15 that carries it, be easily changed in case of wear. Thanks to this arrangement, the tapping in the bore of the axle is thus omitted.

In FIGS. 3 to 9, elements analogous to those already described bear the same reference numerals.

Figure 3:
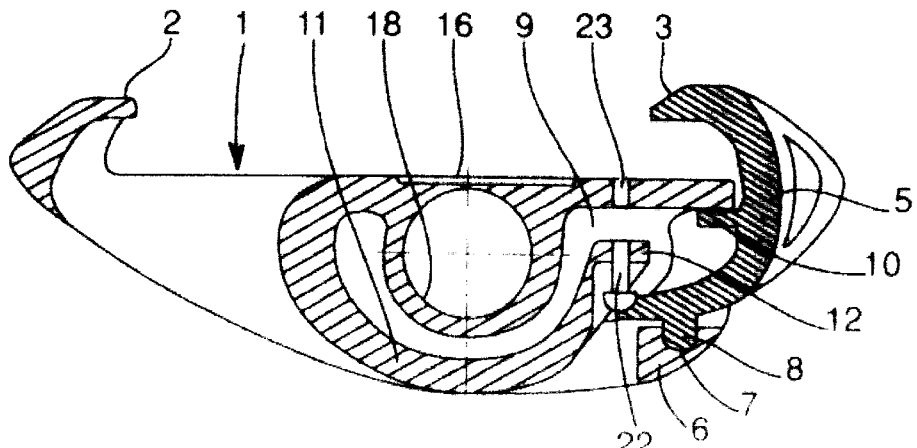
FIG. 3 is a longitudinal cross-sectional view of a pedal according to another embodiment of the invention, comprising a device for adjusting the tension of the resilient means associated with the rear hook.

FIG. 3 shows schematically a variant of the pedal according to the first embodiment described with reference to FIGS. 1 and 2. In this modification, the curved resilient blade 11 is moreover provided with a device for adjusting its tension. This device comprises an adjustment screw 22 connecting the end 12 of the curved blade 11 to the swinging lever 5. The tapped rod of the screw is screwed into a tapped hole at the end 12 of the blade 11, whilst its head rests against the lower end of the lever 5. The foot of the screw is provided with a slot (not shown) permitting screwing the screw by introducing a small screwdriver through a through-hole 23 provided in the upper surface of the pedal body and aligned with the screw 22. It is thus possible to adjust the distance between the end 12 of the curved blade 11 and the lower end of the lever 5 to stress the blade more or less, as a function of the desired difficulty of opening the hooks.

FIGS. 4 and 5 show another embodiment in which the resilient blade 11 is not molded with pedal body 1, but constitutes a detachable assembly with the snap-in securement means 14 which holds the pedal axle 13 axially. This assembly, which is of synthetic material, is separately mounted in FIG. 5. The bearing surface 4 preferably forms a part of this assembly which is moreover maintained in place by pressure on the pedal body. This pressure can preferably take the form of snap-in means to obtain simultaneous snapping on the pedal axle 13 and on the pedal body 1.

FIG. 6 shows a modified embodiment of FIGS. 4 and 5, in which the curved resilient leg is constituted by a steel spring blade 11.1 or the like, on which a piece of synthetic material comprising the snap-in securement means 14 and the bearing surface 4 is overmolded.

FIG. 7 shows another embodiment in which the resilient leg 11.2 and the securement means in the form of a clip 14.1 are constituted of a single bent metallic blade.

For mounting, the clip 14 is first inserted into the bore 18 through a lateral opening 24 communicating with the latter and then the axle of pedal 13 is introduced, which is blocked axially, after which the clip 14.1 is inserted into the throat 19 of the axle.

FIG. 8 shows another embodiment in which the resilient leg 11.3 and the securement means are in the form of a clip 14.2 constituted by a single metallic blade or a single bent metallic filament. The end of this blade or of this filament opposite the end 12 in contact with the lever 5 is maintained in a recess of the pedal body having a shape complementary to that of the blade or filament. The resilient member is emplaced by introducing its central portion into the bore 18 through an opening 26 turned downwardly, and after the introduction of the pedal axle into the bore and its securement by snapping in, the blade or the filament bears against the internal wall of the bore thanks to a small bend 27 forming an upwardly extending protuberance.

Finally, FIG. 9 shows still another embodiment in which the resilient leg 11.4 and the securement means are in the form of a clip 14.3 and are constituted by a single metallic blade which is cut out over a portion to form a small tongue 28. FIG. 10 shows this piece in the form of a blank. One of the ends of the leg is fixed in the pedal body 1, whilst its opposite end 12 constitutes a hook resting against the lever 5.

The small tongue 28 constitutes a clip introduced into the bore 18 through a lateral opening 24 and which is adapted to coact by snapping in with the throat 19 of the pedal axle 13 when the latter is introduced into the bore 18.

A bend region 29 of the small tongue forming the clip 28 is very flexible such that the deformation of the resilient leg 11.4 under the force of the lever 5 will not interfere with the rotation of the axle maintained axially by the clip.

Numerous variations can be envisaged without thereby departing from the scope of the invention.

What is claimed is:

1. In an automatic cycle pedal comprising a pedal body (1) provided with a fixed front hook (2) for engagement with a retaining plate fixed below a bicycle shoe, and a rear engaging hook (3) carried by a swinging lever (5) articulated on a support (6) in the pedal body (1) whilst being continuously urged by resilient means (11) toward the retaining position of the rear hook, the front and rear hooks (2, 3) being adapted to coact to maintain the retaining plate of the shoe against a bearing surface (4) provided on an upper surface of the pedal;

the improvement wherein the resilient means comprises a curved resilient leg (11) coacting with said lever (5), wherein said curved resilient leg (11) is associated with a snap-on securement means (14) on a pedal axle (13) adapted to be connected to a pedal crank, and wherein the body of the pedal (1) and the curved resilient leg (11) are of a single piece of a synthetic material.

2. Automatic cycle pedal according to claim 1, wherein the curved resilient leg (11) is a blade or a spring steel member.

3. Automatic cycle pedal according to claim 1, wherein the pedal axle (13) is provided with a throat (19) receiving the securement means (14) by snapping on so as to define the axial play of the pedal axle (13).

4. Automatic cycle pedal according to claim 3, wherein the pedal axle (13) is provided with two smooth bearings (20, 21) disposed on opposite sides of said throat (19).

5. An automatic cycle pedal, comprising:
- a pedal body having a fixed front hook for engaging a retaining portion of a bicycle shoe, and a rear support;
- a bearing surface against which a retaining portion of a bicycle shoe bears when situated on the pedal;
- a swinging lever having a rear engaging hook for engaging a retaining portion of a bicycle shoe when said rear engaging hook is in a retaining position, said swinging lever being articulated on said rear support, said fixed front hook and rear engaging hook being arranged to maintain a retaining portion of a bicycle shoe against said bearing surface;
- a snap-on securement device that is arranged and adapted to snap onto an axle for the pedal; and
- a curved resilient blade with one end that is curved back to define a hook that acts with said swinging lever and a second end that is associated with said snap-on securement device, said curved resilient blade urging said rear engaging hook to the retaining position,
- wherein said curved resilient blade and said pedal body are of a single piece of material.

6. The pedal of claim 5, further comprising an axle for the pedal and wherein said axle comprises a throat on which said snap-on securement device is snapped and that defines axial play of said axle.

7. The pedal of claim 6, wherein said axle comprises two bearings on opposite sides of said throat.

8. An automatic cycle pedal, comprising:
- a pedal body having a fixed front hook for engaging a retaining portion of a bicycle shoe, and a rear support;
- a bearing surface against which a retaining portion of a bicycle shoe bears when situated on the pedal;
- a swinging lever having a rear engaging hook for engaging a retaining portion of a bicycle shoe when said rear engaging hook is in a retaining position, said swinging lever being articulated on said rear support, said fixed front hook and said rear engaging hook being arranged to maintain a retaining portion of a bicycle shoe against said bearing surface;
- a snap-on securement device that is arranged and adapted to snap onto an axle for the pedal; and
- a curved resilient blade with one end that is curved back to define a hook that acts with said swinging lever and a second end that is associated with said snap-on securement device, said curved resilient blade urging said rear engaging hook to the retaining position,
- wherein said second end of said curved resilient blade fits around said snap-on securement device.

9. An automatic cycle pedal, comprising:
- a pedal body having a fixed front hook for engaging a retaining portion of a bicycle shoe, and a rear support;
- a bearing surface against which a retaining portion of a bicycle shoe bears when situated on the pedal;
- a swinging lever having a rear engaging hook for engaging a retaining portion of a bicycle shoe when said rear engaging hook is in a retaining position, said swinging lever being articulated on said rear support, said fixed front hook and said rear engaging hook being arranged to maintain a retaining portion of a bicycle shoe against said bearing surface;
- a snap-on securement device that is arranged and adapted to snap onto an axle for the pedal; and
- a curved resilient blade with one end that is curved back to define a hook that acts with said swinging lever and a second end that is associated with said snap-on securement device, said curved resilient blade urging said rear engaging hook to the retaining position,
- wherein said snap-on securement device carries said bearing surface and attaches said bearing surface to an axle for the pedal.

* * * * *